Feb. 25, 1958 A. W. CRAWFORD, JR 2,824,596
TUBE SEALING MACHINE

Filed Sept. 29, 1954 2 Sheets-Sheet 1

INVENTOR.
ANDREW W. CRAWFORD JR.
BY
*Stefan M Stein*
ATTORNEY

Feb. 25, 1958    A. W. CRAWFORD, JR    2,824,596
TUBE SEALING MACHINE

Filed Sept. 29, 1954    2 Sheets-Sheet 2

INVENTOR.
ANDREW W. CRAWFORD JR.
BY
*Stefan M Stein*
ATTORNEY

United States Patent Office 2,824,596
Patented Feb. 25, 1958

2,824,596
TUBE SEALING MACHINE

Andrew W. Crawford, Jr., New York, N. Y., assignor to Olin Mathieson Chemical Corporation, New Haven, Conn., a corporation of Virginia Application September 29, 1954, Serial No. 459,141

2 Claims. (Cl. 154—42)

This invention relates to the heat sealing of plastic resinous film and more particularly to an apparatus and process for forming bag shaped structures.

With the advent of lay-flat plastic tubular stock, otherwise defined as plastic film extruded in large diameter tubular form, the making of bag shaped structures became simplified. Vertical seaming was avoided and a better appearing bag resulted. However, the bottom seal of the bag required techniques which were not only wasteful of material but also required exacting conditions for making such seals.

Figure 1:
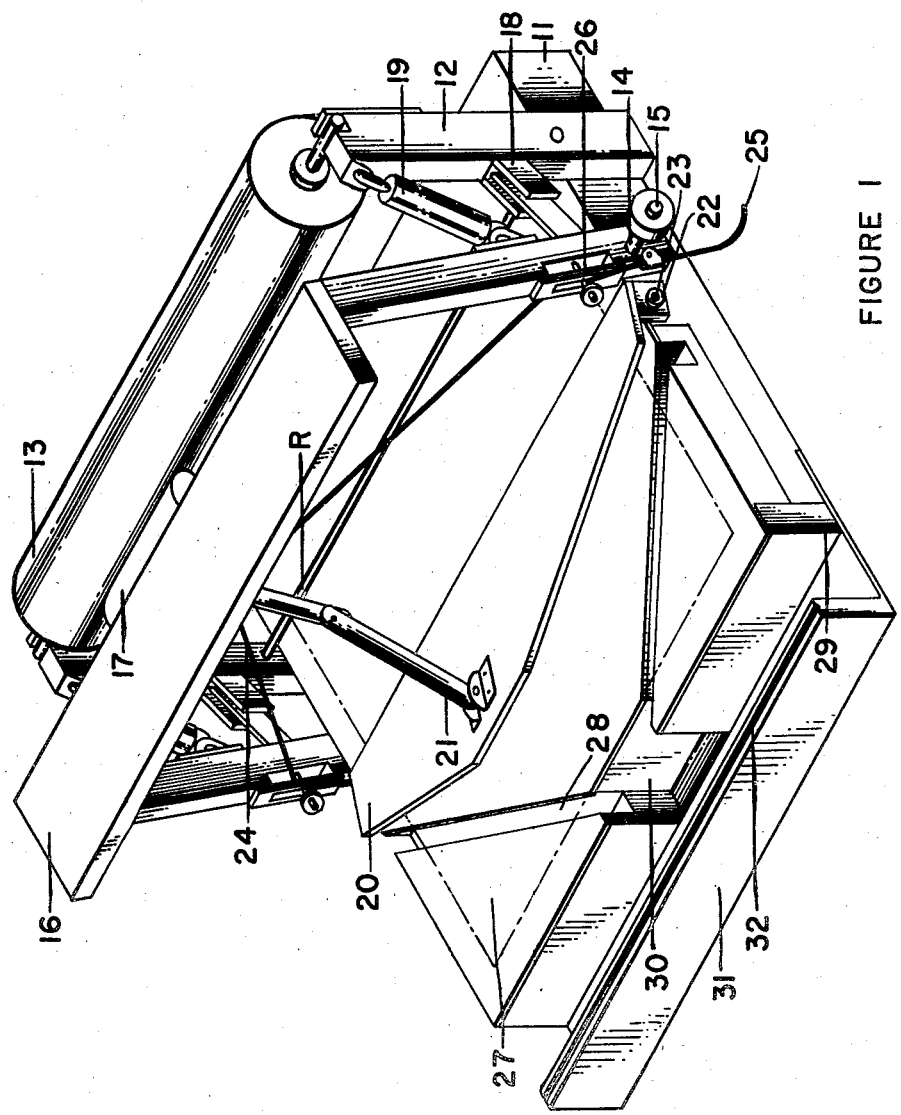
Figure 2:
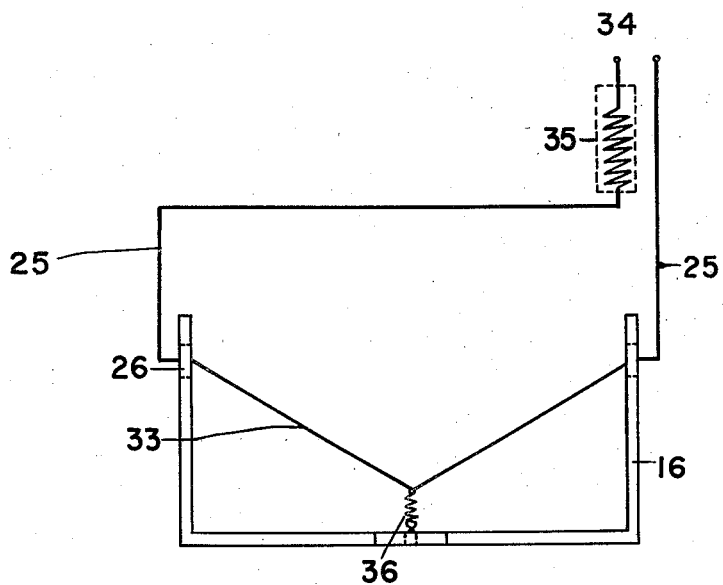

An object of this invention is a novel heat sealing machine and method of operation for sealing plastic tubular stock. A further object of this invention is a heat sealing machine which is easy to operate and to maintain. Another object of this invention is a heat sealing machine which can utilize sealing members of various shapes so as to be of even further utility than prior machines to the owner whose specialized needs may require more than one type of seal. Other objects will become apparent to those skilled in the art upon reading the following detailed disclosure in which:

Figure 1 discloses a pictorial view of one embodiment of the heat sealing machine of this invention, and Figure 2 illustrates one embodiment of the electrical heat sealing means as attached to the descendable heat sealing frame and of the circuit for applying electricity to the electrical heat sealing element.

In accordance with the objects enumerated above, sealing of plastic resinous film is accomplished by the use of an apparatus having a flat table member for supporting the plastic tubular stock in a flattened position, and a controlled descendable frame hinged to the table containing a heat-sealing element of the desired configuration. More particularly, the tube sealing machine of this invention has a flat table member, a table superimposing member having channels therein for receiving the heat sealing element of the descendable frame, an automatically controlled descendable frame hinged to the table and containing preferably a hot wire or heated knife edge sealer of desired design, a pressure plate assembly also hinged to the table for "fixing" film as it is being sealed and an electrical circuit for heating said hot wire or heated knife edge sealer.

Referring to the drawings for the purpose of illustrating a particular embodiment of this invention, in Figure 1 there is shown a flat table member 11, having upright roll supporting brackets 12 affixed thereto for supporting in a dispensing fashion a supply roll 13 of plastic tubular stock. An idler roll R spans the space between the brackets. Hinged to the flat table member at 14, through bolt 15, having a handle thereon for easy adjustment, is a descendable sealing frame 16. At the upper edge of the face board of this descendable frame is a handle 17. Near its hinged edge portion is a magnetic latch 18 shown in elementary form which holds it in an upright position until released by downward pressure upon handle 17. Upon exertion of downward pressure the descendable frame descends by the force of gravity. This descending motion is restrained and controlled by an adjustable speed pneumatic cylinder 19 which is affixed to the upper edge portion of the upright roll supporting brackets. Located in front of the descendable frame member 16, is a pressure plate 20. Its normal position is in a partly upright angular level held in place by a bracket 21 affixed to the inner surface of the face plate of the descendable frame member. The pressure plate is hinged to the flat table member at 22 by means of an adjustable bolt member 23. The pressure plate is shaped substantially similarly to but slightly smaller than the seal being produced by the heat sealing means 24 of the descendable frame member. This heat sealing means is preferably a hot Nichrome wire, but other means such as a heated knife edge sealer are also operable. Current for the purpose of heating the heat sealing means is supplied by insulated wire 25 and insulated bracket 26.

Superimposed upon the flat table member is a table cap 27 having seal channels 28 therein for the purpose of receiving the heat sealing means of the descendable sealing frame. As shown, the channels are shaped to product a garment bag. Other channels in the table cap would be needed if other seals were being made. Along the forward edge portion of the table, as seen in Figure 1 is a table edge extension 29 which has a channel 30 therein for the purpose of receiving the spring of the descendable frame member as shown in the circuit diagram of Figure 2. Where two or more springs are used in the frame member, obviously more channels will be needed. Along the foremost portion is a cutting block 31 having cutting slot 32 therein for the purpose of severing the film transversely after the seal has been made.

In Figure 2 there is shown a preferred embodiment of a circuit diagram and of a top view of the descendable frame member upon which the sealing wire is mounted. It consists of a Nichrome wire 33 as the sealing means. Current is supplied to this sealing means by means of insulating wires 25 and insulated brackets 26 which are connected to current source 34 having a variable resistor 35 therein. Sufficient wattage is supplied to the sealing member to heat it to a temperature sufficient to seal the plastic tubing. Spring 36 keeps the heat sealing wire taut during its use. Here again, if seals other than the V-shaped seal are being made, two or more springs are needed to shape the Nichrome wire in the desired shape, such as for example, a W shape.

The table superimposing member, table edge extension and the sealing member as well as the pressure plate can all be made, as shown, to be interchangeable with other similar devices for making seals other than the one shown. The typical variations in other seals that can be made requiring such an interchange, are for example, those for making banana shrouds, shrouds for primal meat cuts, and the like. Various shaped seals for use by the garment industry, such as for raincoats, umbrella covers, etc., might also be produced by this machine if the seal is modified.

In the construction of the machine, a substitute cutting means for severing the plastic after it has been sealed such as a guillotine arrangement in place of the cutting block and manually operated knife might be employed. It is also possible to utilize latch means other than the magnetic type shown. Other descent restraining means may also be used such as those employing friction, counter balances or spring force.

The invention having thus been described, what is claimed and desired to be secured by Letters Patent is as follows:

1. A tube sealing machine comprising a table member having supply roll brackets disposed at one end thereof and having recessed channels formed in the opposite end thereof, a frame member carrying a heat sealing means straddling the table and hinged to the table intermediate said end portions, said frame member being rotatable in a direction which tends to move the heat sealing means towards the table, a pressure plate hinged to the table and to the frame member and adapted to rotate with the frame member to engage and clamp matter to be disposed on the table prior to the presentation of the heat sealing means and a cutting block cooperating with the table and the frame member for severing predetermined lengths of the tube being sealed.

2. A sealing machine for welding layers of pliable plastic sheet material together comprising a table, a frame member pivotally mounted to the table, a pressure plate hinged to the table and to the frame so as to pivot with the frame, a sealing wire carried by the frame and adapted to be received in a recess formed in the table, a magnetic latch for retaining the frame in a raised position with respect to the table, an air cylinder for restraining the frame when the frame is rotated in a direction which tends to move the pressure plate and the sealing wire towards the table and handle means for rotating the frame and the pressure plate towards the table whereby the layers of platsic material are first clamped between the pressure plate and the table and thereafter and upon further rotation of the frame the heat sealing wire engages the material to weld the layers together and to cut the marginal portions of the welded layers from the main body of the material.

References Cited in the file of this patent
UNITED STATES PATENTS

| | | |
|---|---|---|
| 2,248,248 | Nye et al. | July 8, 1941 |
| 2,575,798 | Dain | Nov. 20, 1951 |
| 2,679,280 | Marsh | May 25, 1954 |
| 2,694,027 | Calkins | Nov. 9, 1954 |
| 2,707,985 | Binnall | May 10, 1955 |
| 2,726,706 | Hakomaki | Dec. 13, 1955 |
| 2,741,296 | Collins | Apr. 10, 1956 |
| 2,751,966 | Techtmann | June 26, 1956 |